United States Patent
Gu et al.

(10) Patent No.: US 10,733,052 B2
(45) Date of Patent: Aug. 4, 2020

(54) ACCELERATED REBUILDING OF STORAGE ARRAYS

(71) Applicant: International Business Machines Corporation, Armonk, NY (US)

(72) Inventors: Hanzhang Gu, Shanghai (CN); Jun Gu, Shanghai (CN); Chuan Li, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 15/849,821

(22) Filed: Dec. 21, 2017

(65) Prior Publication Data

US 2019/0196910 A1    Jun. 27, 2019

(51) Int. Cl.
  *G06F 11/10*  (2006.01)
  *G06F 3/06*   (2006.01)

(52) U.S. Cl.
  CPC ........ *G06F 11/1088* (2013.01); *G06F 3/0689* (2013.01); *G06F 11/1092* (2013.01); *G06F 3/0619* (2013.01)

(58) Field of Classification Search
  CPC ............. G06F 11/1076; G06F 11/1084; G06F 11/1088; G06F 11/1092; G06F 11/16; G06F 11/20; G06F 11/2017; G06F 11/053; G06F 11/2094; G06F 2211/1002; G06F 3/0614; G06F 3/0619; G06F 3/0689
  See application file for complete search history.

(56) References Cited

U.S. PATENT DOCUMENTS

| | | | | |
|---|---|---|---|---|
| 5,357,509 A | * | 10/1994 | Ohizumi | G06F 3/0601 714/6.32 |
| 5,941,994 A | * | 8/1999 | DeKoning | G06F 11/201 714/6.32 |
| 8,086,893 B1 | * | 12/2011 | MacFarland | G06F 11/1088 714/3 |
| 8,307,159 B2 | | 11/2012 | McKean | |
| 8,719,621 B1 | * | 5/2014 | Karmarkar | G06F 11/1076 714/6.1 |
| 8,909,859 B2 | | 12/2014 | Bandic et al. | |
| 8,959,389 B2 | | 2/2015 | Kulkarni | |
| 10,095,585 B1 | * | 10/2018 | Proulx | G06F 11/2094 |
| 2006/0161823 A1 | * | 7/2006 | Sato | G06F 11/1092 714/710 |
| 2007/0088990 A1 | * | 4/2007 | Schmitz | G11B 20/20 714/700 |
| 2008/0126838 A1 | * | 5/2008 | Sangapu | G06F 11/1092 714/6.32 |
| 2009/0204758 A1 | * | 8/2009 | Luning | G06F 3/0611 711/114 |
| 2010/0211731 A1 | * | 8/2010 | Mittendorff | G06F 12/0866 711/113 |
| 2017/0024295 A1 | * | 1/2017 | Klughart | G06F 16/183 |
| 2017/0115898 A1 | | 4/2017 | Franke et al. | |
| 2019/0004899 A1 | * | 1/2019 | Gao | G06F 11/1092 |

\* cited by examiner

*Primary Examiner* — Gabriel Chu
(74) *Attorney, Agent, or Firm* — Daniel C. Housley

(57) ABSTRACT

The disclosure provides a method for accelerating the rebuilding of storage arrays. The method comprises identifying a failure of an original storage device that is a member of a storage array and reconstructing lost information that was on the original storage device onto one or more first storage devices based on information stored on one or more of remaining members of the storage array. Each of the one or more first storage devices has a higher I/O throughput than the original storage device.

19 Claims, 7 Drawing Sheets

ACCELERATED REBUILDING OF STORAGE ARRAYS

BACKGROUND

The present disclosure relates to storage systems, and more specifically, to the accelerated rebuilding of storage arrays.

With the increasing need for large-capacity and reliable data storage in recent years, more and more data storage systems are adopting architectures involving multiple storage devices arranged in an array, such as Redundant Array of Independent Disks (RAID). In a RAID, data and parities are stored across multiple independent physical disk drive components to provide data redundancy, performance improvement, or a mix of those two objectives. There are several types of RAID schemes that are commonly used, including RAID-0, RAID-1, RAID-10, RAID-3, RAID-4, RAID-5, RAID-6, etc.

Data redundancy of a RAID provides integrity of data stored on the RAID, to a certain extent. If one or more member disks in a RAID fail, a user can recover the RAID by using a spare disk and starting a "rebuilding" process. The rebuilding first kicks the failed disk out of the RAID and replaces it with a spare disk. Then it uses the data and parities on other member disks to calculate the contents on the failed disk. Finally, it writes the calculated contents onto the spare disk, so that the spare disk serves as a member of the RAID in place of the failed disk. The rebuilding finishes when all the data and parities are synchronized.

SUMMARY

Disclosed herein are embodiments of a method, system, and computer program product for accelerating the rebuilding of a storage array.

According to an embodiment of the present disclosure, a computer-implemented method is provided. The method comprises identifying a failure of an original storage device that is a member of a storage array. The method further comprises reconstructing lost information that was on the original storage device onto one or more first storage devices based on information stored on one or more of remaining members of the storage array. Each of the one or more first storage devices has a higher I/O throughput than the original storage device.

According to another embodiment of the present disclosure, a computing system is provided. The computing system comprises one or more processors and a memory coupled to at least one of the one or more processors. The computing system further comprises a set of computer program instructions stored in the memory and executed by at least one of the one or more processors in order to perform actions of identifying a failure of an original storage device that is a member of a storage array and reconstructing lost information that was on the original storage device onto one or more first storage devices based on information stored on one or more of remaining members of the storage array. Each of the one or more first storage devices has a higher I/O throughput than the original storage device.

According to further embodiment of the present disclosure, a computer program product is provided. The computer program product comprises a computer readable storage medium having program instructions embodied therewith. The program instructions are executable by a computer to cause the computer to identify a failure of an original storage device that is a member of a storage array. The program instructions executable by the computer further causes the computer to reconstruct lost information that was on the original storage device onto one or more first storage devices based on information stored on one or more of remaining members of the storage array. Each of the one or more first storage devices has a higher I/O throughput than the original storage device.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure. Through the more detailed description of some embodiments of the present disclosure in the accompanying drawings, the above and other objects, features, and advantages of the present disclosure will become more apparent, wherein the same reference generally refers to the same components in the embodiments of the present disclosure.

Figure 1:
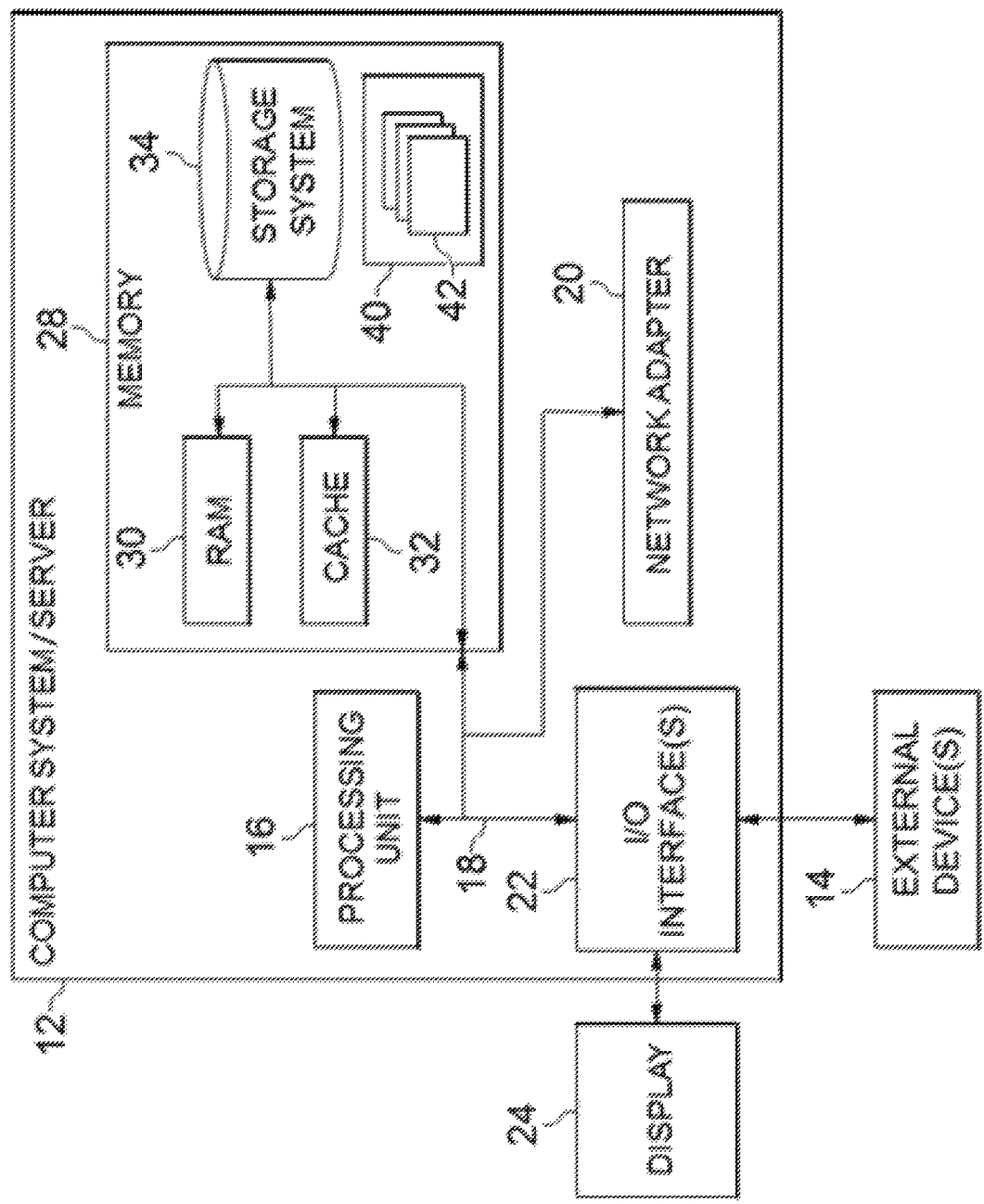
FIG. 1 shows an exemplary computer system which is applicable to implement the embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Referring now to FIG. 1, in which an exemplary computer system/server 12, which is applicable to implement the embodiments of the present disclosure, is shown. FIG. 1 is also adapted to depict an illustrative example of a portable electronic device, such as a communication device, which is applicable to implement the embodiments of the present disclosure. Computer system/server 12 is only illustrative and is not intended to suggest any limitation as to the scope of use or functionality of embodiments of the disclosure described herein.

As shown in FIG. 1, computer system/server 12 may be in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it may include both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from, and writing to, a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be implemented using the computer system/server 12. Now, with reference to FIG. 2-7, some embodiments of the present disclosure will be described below.

Existing RAID schemes typically perform a rebuilding process (also referred to as a recovery process) to recover from the failure of a member storage device of the RAID. The rebuilding may involve accessing contents on other storage devices, reconstructing contents on the failed storage device based on the contents on the other storage devices, and writing the reconstructed content onto a spare storage device that serves as a replacement of the failed storage device. However, a RAID may lose the protection of data redundancy during the rebuilding. Take a storage system using a RAID-5 scheme over the array of storage devices as an example. While the rebuilding for a first failed storage device of the RAID is underway, if another member storage device also fails, the RAID must be taken offline, since it is no longer able to reconstruct the contents on the first failed storage device. Therefore, it is crucial to reduce the time of rebuilding in order to minimize the risk or exposure to another storage device failure and to protect data integrity in the RAID.

Furthermore, in recent years, the capacity of a typical storage device for RAID, such as a hard drive disk (HDD), has experienced considerable growth, while its I/O throughput has seen very limited improvement. This results in even longer average rebuilding times. It may take hours, or even days, to rebuild an enterprise RAID system. For example, considering a RAID consisting of 4 TB HDDs, the rebuilding time for a failed HDD member may be up to a day. This time-consuming rebuilding process greatly increases the risk of another storage device failure and makes the consequence thereof even more unacceptable, as larger single storage device capacity means more data lost.

Normally, in the rebuilding process, a "hot spare" can be used as a replacement storage device. As used herein, "hot spare" means a spare storage device that can be used to replace a failed physical storage device in a storage system while the storage system remains active. In the scenario of RAID, when a hot spare is used to replace a failed storage device in the array during the rebuilding, accessibility to the remaining storage devices in the array may be maintained. Therefore, replacement with a hot spare does not require the storage system to be shut down, thereby avoiding down time of the system. However, even via a hot spare, the rebuilding process still involves a great deal of read-write activities, which may degrade the overall system performance and delay access to the remaining storage devices. The longer the rebuilding process is, the greater the impact on the system performance will be.

Therefore, there is a need for a solution for accelerating the rebuilding process of storage arrays.

Figure 2:
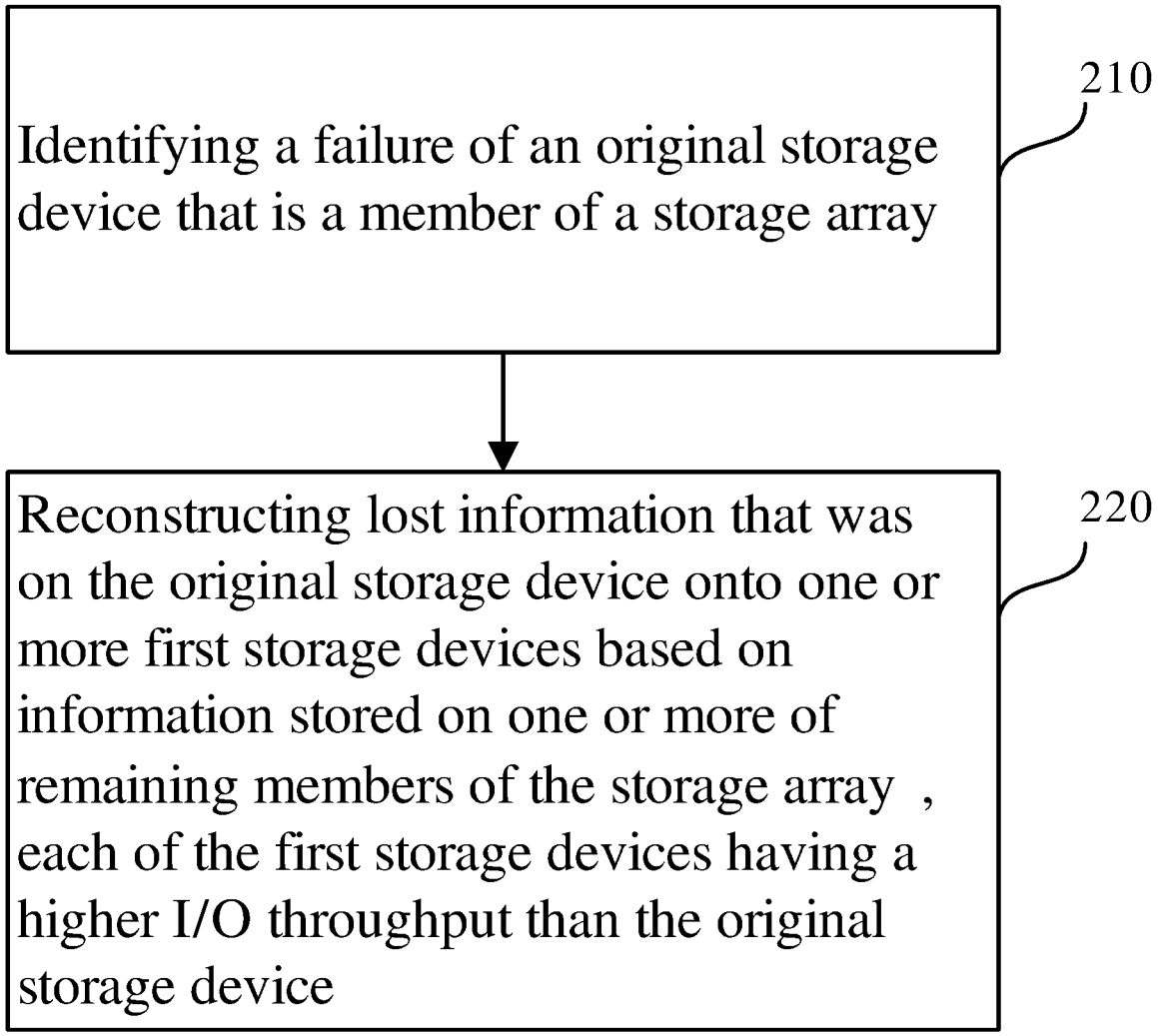
FIG. 2 is a flow chart showing an exemplary method for accelerating rebuilding of a storage array according to an embodiment of the present disclosure.

With reference now to FIG. 2, FIG. 2 is a flow chart illustrating an exemplary method 200 for accelerating the rebuilding of a storage array, according to an embodiment of the present disclosure.

As shown at 210, method 200 may include identifying a failure of an original storage device that is a member of a storage array. The storage array includes one or more storage devices that store computer readable data. The storage array may include any number of storage devices, such as one, two, three, four, and so on. Generally, a storage device in an array may be a non-volatile memory, such as an HDD, an SSD (solid state drive), a Flash memory, etc. The storage array may include a combination of storage device types. The one or more storage devices may have the same storage capacity. Alternatively, the one or more storage devices may have different storage capacities. Generally, when the storage devices in a storage array have different capacities, the overall capacity of the array may be limited by the storage device with the smallest capacity, which may be less cost-effective.

As used herein, the term "a failure of a storage device" means a storage device has failed or there is an indication of imminent failure of the storage device. A storage device may fail at any time in many different situations from various causes. Some storage devices fail because of wear-outs, while some others fail prematurely. A storage array including one or more storage devices may be monitored for performance and failure analysis. A failure of a storage device may be identified through various signs, including but not limited to: repeated but recoverable read or write errors, unusual noises, excessive and unusual heating, or other abnormalities. In some embodiments, a failed storage device may be completely physically inaccessible. In other embodiments, a failing storage device may also be treated as a failed storage device.

According to an embodiment of the present disclosure, there may be more than one failed storage devices in a storage array. For some kinds of storage array, even if two or more original storage devices have failed, the storage array can still be active because of data redundancy, and the information on the failed storage devices may be recoverable. In other words, the number of failed storage devices may be tolerable, depending on the data redundancy strategy of the storage array.

As shown at 220, lost information that was on the original storage device may be reconstructed onto one or more first storage devices based on information stored on one or more of remaining members of the storage array. Lost information on a failed storage device may refer to the information stored on the storage device that cannot be accessed or cannot be accessed properly due to the failure. In some embodiments, lost information may be all of the contents including data and parity (if any) stored on the failed storage device. In other embodiments, lost information is only corresponding to part of the contents stored on the failed storage device, while the rest part of the contents is still accessible. In the latter case, the lost information can be reconstructed by performing the step as shown at 220, and the remainder of the contents can be directly transferred to the one or more first storage devices using various data transfer techniques. In some scenarios, lost information on a failed storage device may refer to all the information stored on a failed storage device, regardless of the mode of failure or the accessibility of the information. In any case, with the lost information reconstructed, the one or more first storage devices may serve, at least temporally, as a member of the storage array in place of the failed storage device.

According to an embodiment of the present disclosure, each of the one or more first storage devices may have a higher I/O throughput than the original storage device. As used herein, I/O throughput for a storage device means rate of data transfer from and/or to the storage device. According to an embodiment of the present disclosure, the storage array may be a RAID composed of HDDs (e.g., the original storage device is an HDD) and one or more first storage devices are SSDs, but it should be appreciated that the types of original storage device and the first storage devices are not limited to this example. Compared with rebuilding using a spare storage device that is exactly the same as the original storage device, this may reduce the time for writing back the reconstructed information, and thus accelerate the speed of the rebuilding process.

As mentioned above, a storage array generally uses data redundancy across its member storage devices for protecting the integrity of data. Data redundancy for a storage array may be implemented thusly: when actual data is to be stored on one storage device in the array, additional information is stored on some other storage devices in the array. The additional data can be a complete copy of the actual data, or only pieces of data, or a calculation based on the actual data according to some algorithm. As such, the additional data allows detection of errors and reconstruction of lost or damaged data up to a certain level. With data redundancy, for any information stored on a storage device in a storage array, there is always additional or associated information on one or more of the remaining members that can be utilized to reconstruct the information.

According to an embodiment of the present disclosure, which of the remaining members in a storage array are required to reconstruct the information stored on a storage device depends on the specific data redundancy strategy of the array. For a storage array that provides data redundancy by data mirroring, such as RAID 1, only one storage device is needed for the reconstructing. For a storage array that provides data redundancy by striping and parity, such as RAID 2, 3, 4, 5 and 6, all the storage devices in the array involved in the striping and parity are needed for the reconstructing.

According to an embodiment of the present disclosure, the lost information may be reconstructed onto a plurality of first storage devices, each having a storage capacity smaller than the original storage device. It may be appreciated that the number of the one or more first storage devices used for the reconstruction depends on the capacity of the original storage device. Specifically, the overall capacity of the one or more first storage devices should be no smaller than the storage capacity of the failed storage device. When each of the first storage devices has a smaller capacity than the original storage device, a plurality of first storage devices may be needed. This may be advantageous because storage arrays with different storage capacities can be rebuilt with a flexible combination of first storage devices. Preferably, the lost information can be reconstructed onto the plurality of first storage devices in parallel so that the time for rebuilding could be further reduced.

During the step of reconstructing as shown at 220, the storage array remains active. Any access to the lost information on the failed storage device may be handled by redirecting the access to other members in the array or by calculating the lost information based on the contents on the other members. When the reconstruction is accomplished, any access to the failed storage device would be redirected to the one or more first storage devices. In this way, the one or more first storage devices serve as members of the storage array in place of the original storage device.

Thereafter, a second storage device may be used to replace the one or more first storage devices. This replacement may be different from the replacement of the original storage device with the one or more first storage devices in that, this time the one or more first storage devices still function normally. Therefore, the data can be directly copied from the one or more first storage devices to the second storage device. According to some embodiments of the present disclosure, the exemplary method 200 may further comprise transferring the reconstructed information from the one or more first storage devices to the second storage device. After the transferring, any access to the one or more first storage devices may be redirected to the second storage device. Therefore, the second storage device may be used as a member of the storage array in place of the original storage device. The second storage device may be any kind of non-volatile memory, such as HDD, SSD or a flash memory. In some embodiments of the present disclosure, the second storage device is of the same storage type with the original storage device, e.g., both may be HDDs.

Once the reconstructed data has been transferred to the second storage device, the one or more first storage devices may be released from the storage array and are available for subsequent rebuilding of a storage array, or other tasks. For example, the one or more first storage devices may be used for subsequent rebuilding of the same storage array if another failure of any member in the array occurs. Then the exemplary method 200 can be implemented again. In some other cases, if there are other storage arrays, the one or more first storage devices may be shared by all the arrays for the rebuilding purpose, e.g., serve as a hot spare for all the arrays. Furthermore, according to an embodiment of the present disclosure, while a first storage device is in idle, e.g., it is not used for rebuilding, it can be used as a read cache for a storage array according to a tiered storage strategy.

For ease of description, some more specific embodiments of the present disclosure will be described below with reference to FIGS. 3-7 in the case that the storage array is a RAID consisting of HDDs, the first storage devices are SSDs and the second storage devices are HDDs.

Figure 3:
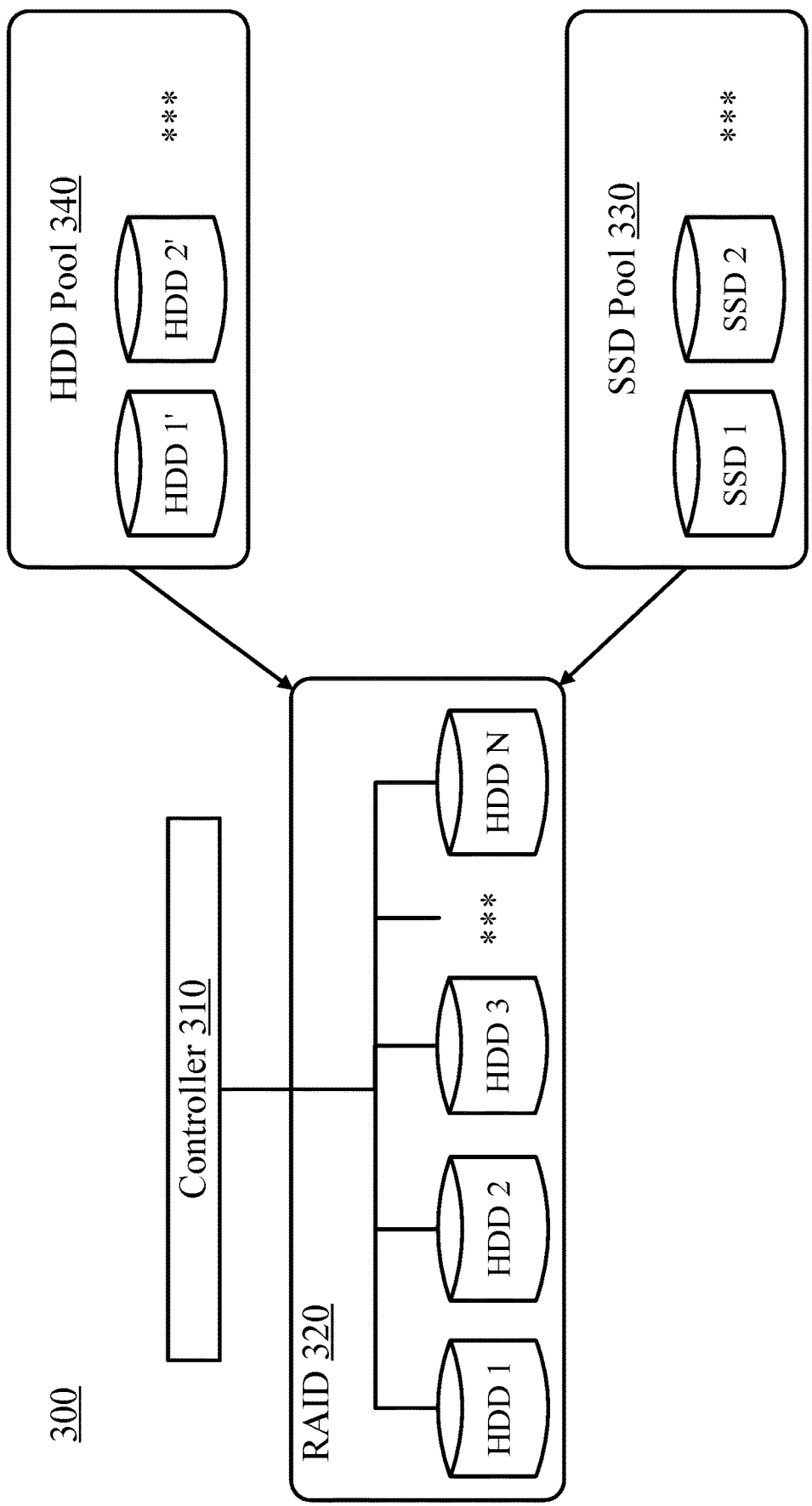
FIG. 3 shows an exemplary storage system according to an embodiment of the present disclosure.

FIG. 3 shows an exemplary storage system 300, according to an embodiment of the present disclosure. Storage system 300 may include a controller, such as controller 310, and a storage array, such as RAID 320. It may be appreciated that the storage system may have more than one storage array. Controller 310 may be a hardware component that uses software such as firmware and/or drivers to store data across a storage array. Controller 310 may be a dedicated RAID controller chip, or simply a standard drive controller chip with proprietary firmware and drivers. Controller 310 may be configured to control storage of data across members of RAID 320, and control read/write operations directed to members of RAID 320. Controller 320 may also be responsible for monitoring RAID 320 for performance and failure analysis. RAID 320 may use a plurality of storage devices such as HDDs 1~N to store data. Preferably, HDDs 1~N may have the same storage capacity.

In order to avoid data loss caused by failures of HDDs, controller 310 may use a data redundancy strategy to protect the integrity of data in the RAID. Different RAID schemes may adopt different data redundancy strategies to improve the performance and/or increase the availability of storage system. Parity may be used as the data redundancy or error protection strategy for many RAID schemes.

According to an embodiment of the present disclosure, storage system 300 may further comprise SSD pool 330 which includes one or more SSDs, such as SSD 1, SSD 2 and so on, and serves as a hot spare pool. The one or more SSDs may have the same storage capacity, or they may have different storage capacities. SSD pool 330 may be communicatively coupled to RAID 320 via the controller 310. SSDs may have a higher I/O throughput than HDDs 1~N in RAID 320. When a failure of any of HDDs 1~N occurs, rebuilding of RAID 320 is needed. The rebuilding time largely depends on the speed of writing back the reconstructed contents to a hot spare. Using one or more SSDs from SSD pool 330 as a hot spare to rebuild RAID 320 can increase the speed of writing back, thereby reducing the rebuilding time. Typically, SSDs have smaller storage capacities than HDDs 1~N in RAID 320. Small capacity of SSDs enables flexibility in replacing HDDs with various storage capacities. More specific details will be described with reference to FIGS. 4 and 5.

According to an embodiment of the present disclosure, storage system 300 may further comprise HDD pool 340 which includes one or more HDDs, such as HDD 1', HDD 2' and so on, and serves as another hot spare pool. HDD pool 340 may be communicatively coupled to RAID 320 via the controller 310. After RAID 320 is rebuilt by using one or more SSDs from SSD pool 330 to replace a failed HDD, one or more HDDs from HDD pool 340 may be used to further replace the one or more SSDs. In this way, the RAID will be eventually rebuilt with a spare HDD in HDD pool 340, just as the conventional way of rebuilding an HDD-RAID. More specific details will be described with reference to FIG. 6.

In some embodiments, an SSD in SSD pool 330, while idle, can be used as a read cache for RAID 320 or another RAID in the storage system, e.g., according to a tiered storage strategy. In some embodiments, the one or more SSDs in SSD pool 330 may be local to RAID 320, so as to ensure the acceleration of the rebuilding process by using SSDs as a hot spare. Preferably, the one or more HDDs in HDD pool 340 are also local to RAID 320.

Figure 4:
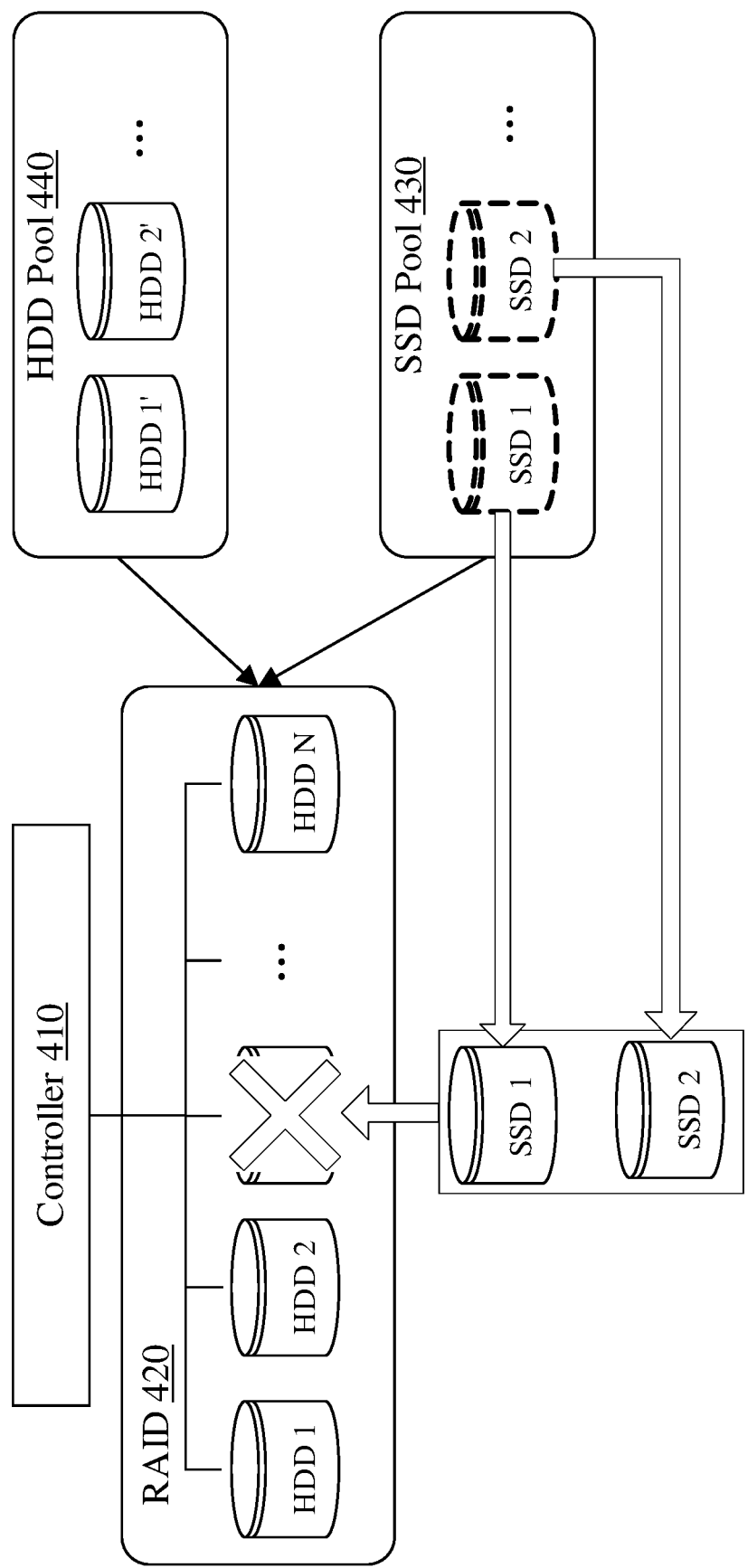
FIG. 4 shows an exemplary process of using SSDs as a hot spare to replace a failed HDD in a RAID according to an embodiment of the present disclosure.

FIG. 4 illustrates an exemplary process 400 of using SSDs as a hot spare to replace a failed HDD in a RAID according to an embodiment of the present disclosure. In FIG. 4, controller 410, RAID 420, SSD pool 430 and HDD pool 440 are similar to controller 310, RAID 320, SSD pool 330 and HDD pool 340 as shown in FIG. 3. FIG. 4 is different from FIG. 3, at least in that one HDD member (e.g., HDD 3) of RAID 420 is marked with a cross, which indicates that a failure of the HDD member has been identified, for example, by controller 410.

Dependent on the data redundancy strategy adopted by RAID 420, RAID 420 may still be active even with several HDD members failed. For example, a RAID-5 can still work if one of the member disks fails, and for RAID-6, it can survive with two failed members. Although FIG. 4 shows only one member of the RAID as failed, it should be appreciated that more than one members of a RAID may fail before loss of the entire RAID, and the tolerable number of failed members in a RAID depends on the specific data redundancy strategy of the RAID.

When controller 410 identifies a failure of, for example, HDD 3 in RAID 420, controller 410 can reconstruct lost information that was stored on HDD 3 onto one or more SSDs from SSD pool 430, based on information stored on one or more remaining HDDs in RAID 420. The number of SSDs used for the reconstruction can be determined such that the overall storage capacity of the SSDs selected for the reconstruction is at least sufficient to recover the lost information on the failed HDD. As shown in FIG. 4, two SSDs, SSD 1 and SSD 2, may used for the reconstruction of the lost information on the failed HDD. In other embodiments, the number of the SSDs for the reconstruction may not be limited to two. Moreover, the number of remaining HDDs needed to reconstruct the lost information depends on the data redundancy strategy of the RAID. In some embodiments, all of the remaining HDDs in the RAID may be used to reconstruct the lost information that was on one failed HDD.

Figure 5:
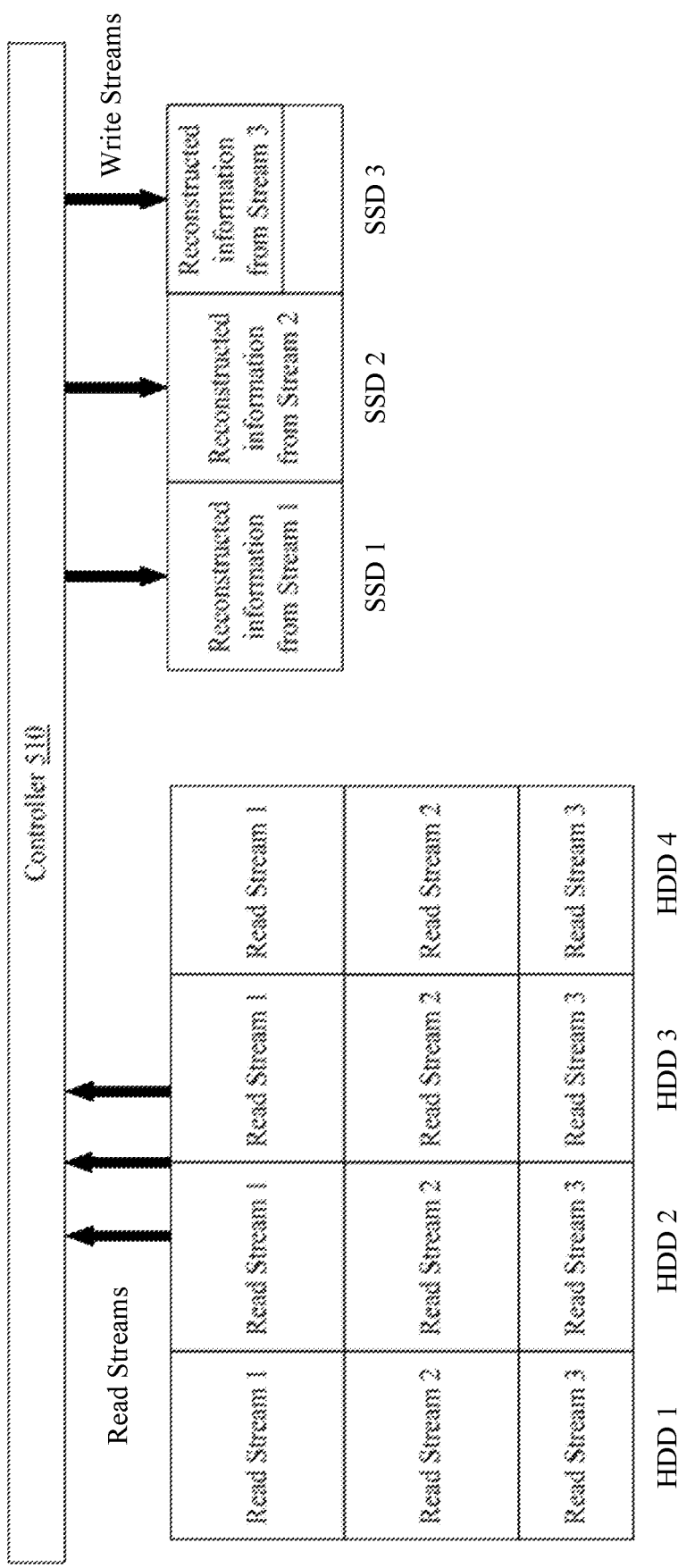
FIG. 5 shows an exemplary process of reconstructing lost information onto SSDs according to an embodiment of the present disclosure.

Next, FIG. 5 shows an exemplary process 500 of the reconstruction, according to an embodiment of the present disclosure. In FIG. 5, as an example, four active HDDs in the RAID and three spare SSDs are used for the reconstruction. As shown in FIG. 5, controller 510 may use three rebuilding streams in parallel. The streams read from the HDDs are referred to as read streams while the corresponding streams written into the SDDs are referred to as write streams.

In FIG. 5, HDDs 1-4 and the failed HDD are in the same RAID. In the reconstruction, information stored on HDDs 1-4 may be read to recover the lost information that was stored on the failed HDD. As shown in FIG. 5, each of HDDs 1-4 has information stored thereon associated with the lost information on the failed HDD. This associated information stored on each of HDDs 1-4 may be read out in one or more read streams by the controller 510. According to an embodiment of the disclosure, each read stream may be associated with one of the SSDs, and comprises information from HDDs 1-4 that is required for the rebuilding on the associated SSD. Thus, the number of read streams may be determined based on the number of SSDs used for the reconstruction. As shown in FIG. 5, three SSDs, SSDs 1-3, may be used for the reconstruction, and accordingly information on each of HDDs 1-4 may be read out in three read streams. Read stream 1 may be associated with SSD 1, Read stream 2 may be associated with SSD 2 and Read stream 3 may be associated with SSD 3. The three read streams may operate in parallel.

Controller 510 reconstructs information to be stored on each SSD based on the corresponding read stream, and writes the reconstructed information to the SSD in a corresponding write stream. As shown in FIG. 5, three write streams may be used for SSDs 1-3, respectively, and they may operate in parallel. Such parallel streams can further reduce the time of rebuilding.

For example, considering a RAID with the maximum logical block address (LBA) of L is to be rebuilt with n SSDs having the same storage capacity, controller 510 will initiate n rebuilding streams simultaneously as follows:

The 1$^{st}$ stream will try to reconstruct the lost information from LBA 0 to $$\left\lfloor \frac{L}{n} \right\rfloor;$$

The 2$^{nd}$ stream will try to reconstruct the lost information from LBA $$\left\lfloor \frac{L}{n} \right\rfloor + 1 \text{ to } 2*\left\lfloor \frac{L}{n} \right\rfloor;$$

...

The i$^{th}$ stream will try to reconstruct the lost information from LBA $$(i-1)*\left\lfloor \frac{L}{n} \right\rfloor + 1 \text{ to } i*\left\lfloor \frac{L}{n} \right\rfloor;$$

The n$^{th}$ stream will try to reconstruct the lost information from LBA $$(n-1)*\left\lfloor \frac{L}{n} \right\rfloor \text{ to } L.$$

Here, $\lfloor m \rfloor$ stands for the integer that is no larger than m. The reconstructed data from the i$^{th}$ stream will be written to the i$^{th}$ SSD. In the case of FIG. 5, the total capacities of SSDs 1-3 are larger than the capacity of the failed HDD, and thus the reconstructed information on SSD 3 may be less than that of SSD 1 or SSD 2. Moreover, in the case where the SSDs have different storage capacities, the rebuilding streams may be adjusted to adapt to the capacity of each SSD.

Figure 6:
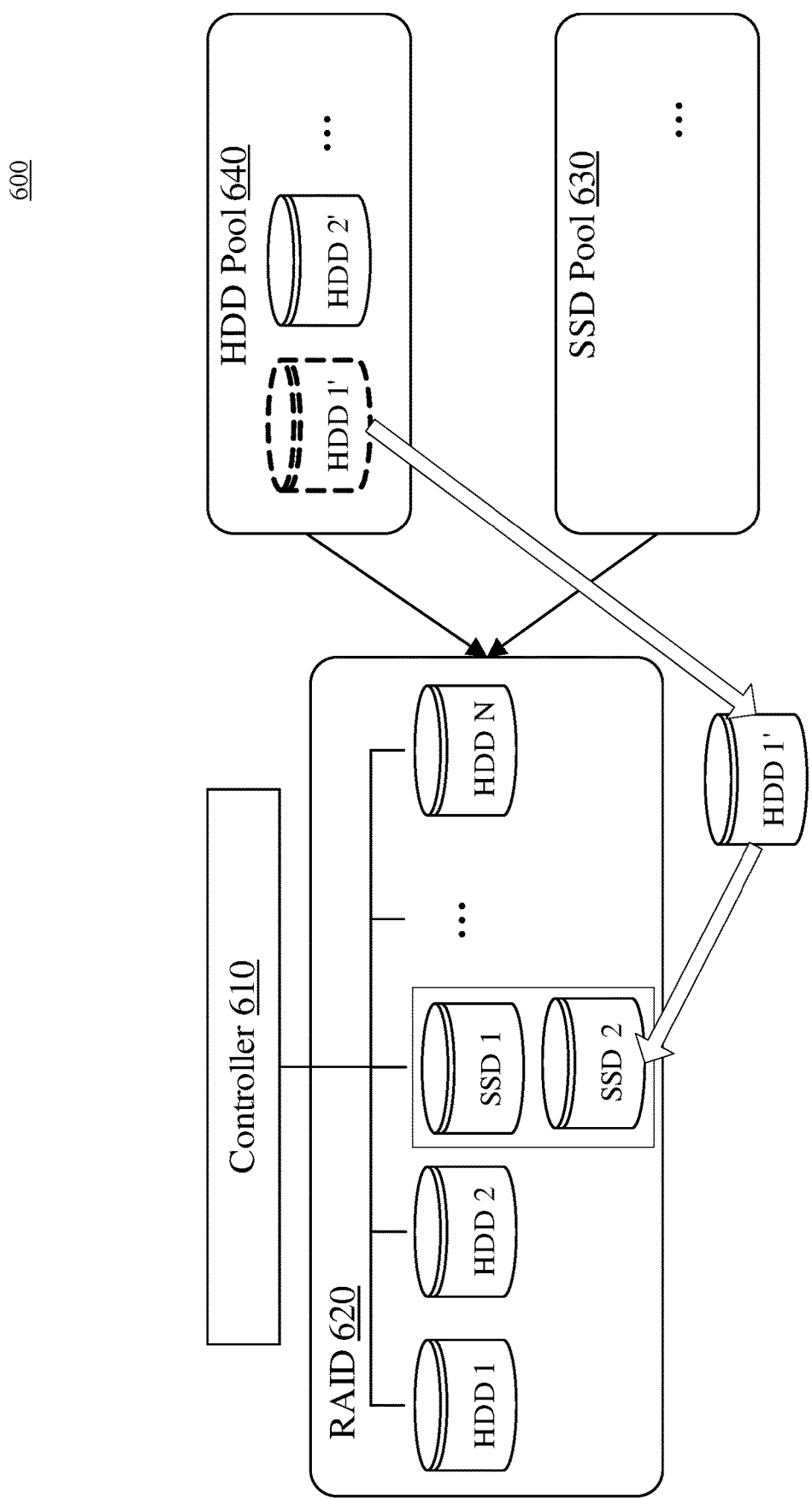
FIG. 6 shows an exemplary process of using a spare HDD to replace the SSDs after the process of FIG. 5 according to an embodiment of the present disclosure.

After the reconstruction, a rebuilt RAID may include one or more SSDs with the reconstructed information stored thereon as well as the remaining HDDs that operate normally. FIG. 6 shows an exemplary process 600 of using a spare HDD to further replace the one or more SSDs in the rebuilt RAID, in accordance with an embodiment. In FIG. 6, controller 610, RAID 620, SSD pool 630, and HDD pool 640 may be substantially similar to controller 410, RAID 420, SSD pool 430, and HDD pool 440 as shown in FIG. 4. As shown in FIG. 6, after the reconstruction described with reference to FIG. 4 and FIG. 5, SSDs 1 and 2 may serve as members of the RAID. A spare HDD, such as HDD 1', from HDD pool 640 may be used by controller 610 to replace the two SSDs. Controller 610 may be configured to transfer the reconstructed information from SSDs 1 and 2 to HDD 1'. Then, HDD 1' may be used by the controller 610 as a member of RAID 620 in place of the original failed HDD 3. HDD 1' may have a storage capacity sufficient for the reconstructed information on SSD 1 and SSD 2. RAID 620 may remain active while transferring the reconstructed information from the two SSDs to HDD 1' and afterwards, HDD 1' may be used as a member of the RAID.

The process of using an HDD to replace the two SSDs as shown in FIG. 6 may be implemented with various techniques, such as Smart Rebuild technique developed by International Business Machine (IBM) Corp. Smart Rebuild is a function that is designed to help reduce the possibility of secondary failures and data loss of RAID arrays. It is used to rebuild a RAID array when certain storage device errors occur and a normal determination is made that it is time to use a spare to proactively replace a failing storage device. If the suspect storage device is still available for I/O, it may be kept in the array, rather than being rejected as under a standard RAID rebuild. A spare may be brought into the array at the same time. The suspect storage device and the new spare may be set up in a temporary RAID 1 association, allowing the troubled storage device to be duplicated onto the spare rather than running a full RAID reconstruction from data and parity. The new spare may then be made a regular member of the array, and the suspect storage device may be rejected from the RAID array. For example, in FIG. 6, if Smart Rebuild is used between the two SSDs (SSD 1, SSD 2) and HDD 1', then the two SSDs would be regarded as the suspect storage devices, and HDD 1' the replacement or spare storage device.

Figure 7:
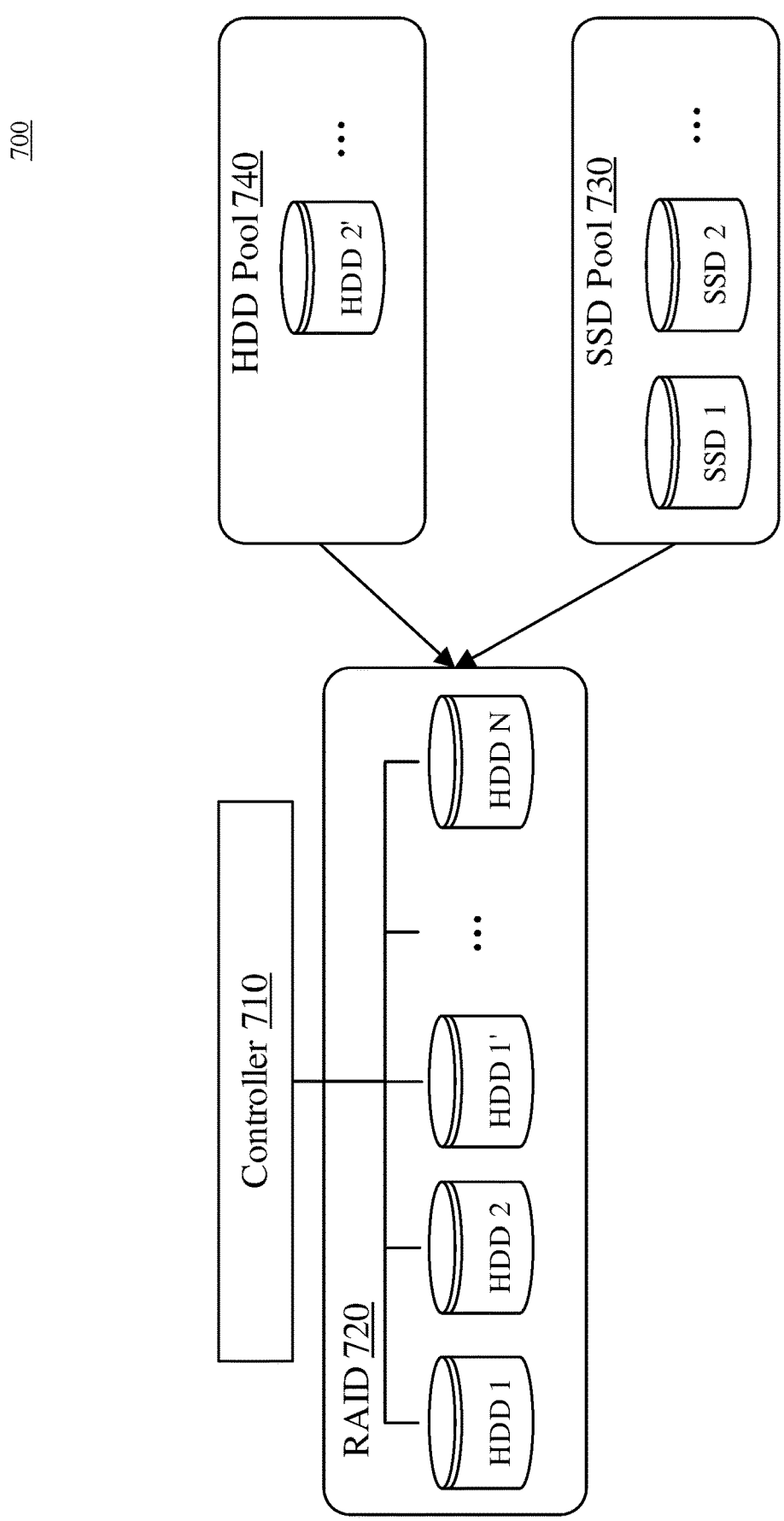
FIG. 7 shows an exemplary state where the SSDs have been released from the RAID to the SSD pool after the process of FIG. 6 according to an embodiment of the present disclosure.

After being replaced with HDD 1', the two SSDs (SSD 1 and SSD 2) may be released from RAID 620. FIG. 7 shows an exemplary state 700, where SSD 1 and SSD 2 have returned to SSD pool 630 for subsequent use. For example, the SSDs may be reused by controller 710 for the rebuilding of RAID 720 in the case that there is another failure of a member in the RAID. The SSDs may also be used for rebuilding any other storage array coexisting in a system together with RAID 720. The recycling use of the SSDs in the SSD pool improves the cost/performance ratio (C/P ratio) of the storage system.

An SSD, such as any one from SSD pool 330, 430, 630 or 730, while in an idle state, may be further used for other purposes to improve the C/P ratio or other overall performance of the storage system. For example, an SSD in idle may be used as a read cache for a RAID according to a tiered storage strategy. When the SSD is used as a read cache for a RAID, hot data that are frequently accessed may be copied to the SSD, for example, automatically and dynamically. Each time the controller wants to read from the RAID, it will try to access the SSD first. In this way, if the cache hit rate is high, the access time to the storage array will be dramatically shortened, especially for the small-size random read.

One example of the tiered storage strategy is System Storage® Easy Tier® technique which is developed by IBM Corp. System Storage® Easy Tier® is a function that responds to the presence of SSDs in a storage system that also contains HDDs. The system automatically and non-disruptively moves frequently accessed data from HDD to SSD, thus placing such data in a faster tier of storage. Easy Tier eliminates manual intervention when assigning highly active data on volumes to faster responding storage. In this dynamically tiered environment, data movement is seamless to upper layer application regardless of the storage tier in which the data resides.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

According to an embodiment of the present disclosure, a computing system is provided. The computing system comprises one or more processors and a memory coupled to at least one of the one or more processors. The computing system further comprises a set of computer program instructions stored in the memory and executed by at least one of the one or more processors in order to perform actions of identifying a failure of an original storage device that is a member of a storage array and reconstructing lost information that was on the original storage device onto one or more first storage devices based on information stored on one or more of remaining members of the storage array, wherein each of the one or more first storage devices has a higher I/O throughput than the original storage device.

According to an embodiment of the computing system, the lost information is reconstructed onto a plurality of first storage devices each having a storage capacity smaller than the original storage device.

According to an embodiment of the computing system, the lost information is reconstructed onto the plurality of first storage devices in parallel.

According to an embodiment of the computing system, the set of computer program instructions are executed by at least one of the one or more processors to further perform actions of transferring the reconstructed information from the one or more first storage devices to a second storage device and using the second storage device as a member of the storage array in place of the original storage device.

According to an embodiment of the computing system, after the transferring, the one or more first storage devices are available for subsequent rebuilding of a storage array.

According to an embodiment of the computing system, while a first storage device is in idle, it is used as a read cache for a storage array according to a tiered storage strategy.

According to an embodiment of the computing system, the storage array is a redundant array of independent disks (RAID) consisting of hard drive disks (HDDs), and the one or more first storage devices are solid state drives (SSDs).

According to an embodiment of the computing system, the one or more first storage devices are local to the storage array.

According to another embodiment of the present disclosure, a computer program product is provided. The computer program product comprises a computer readable storage medium having program instructions embodied therewith. The program instructions are executable by a computer to cause the computer to identify a failure of an original storage device that is a member of a storage array and to reconstruct lost information that was on the original storage device onto one or more first storage devices based on information stored on one or more of remaining members of the storage array. Each of the one or more first storage devices has a higher I/O throughput than the original storage device.

According to an embodiment of the computer program product, the lost information is reconstructed onto a plurality of first storage devices each having a storage capacity smaller than the original storage device.

According to an embodiment of the computer program product, the lost information is reconstructed onto the plurality of first storage devices in parallel.

According to an embodiment of the computer program product, the program instructions executable by the computer further cause the computer to transfer the reconstructed information from the one or more first storage devices to a second storage device and to use the second storage device as a member of the storage array in place of the original storage device.

According to an embodiment of the computer program product, after the transferring, the one or more first storage devices are available for subsequent rebuilding of a storage array.

According to an embodiment of the computer program product, while a first storage device is in idle, it is used as a read cache for a storage array according to a tiered storage strategy.

According to an embodiment of the computer program product, the storage array is a redundant array of independent disks (RAID) consisting of hard drive disks (HDDs), and the one or more first storage devices are solid state drives (SSDs).

According to an embodiment of the computer program product, the one or more first storage devices are local to the storage array.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying a failure of an original storage device that is a member of a storage array;
   reconstructing lost information that was on the original storage device onto one or more first storage devices based on information stored on one or more of remaining members of the storage array, wherein each of the one or more first storage devices has a higher I/O throughput than the original storage device, wherein a number of read streams are used to read the storage array, the number of read streams including at least three, and wherein a number of write streams equal to the number of read streams is used to write to the one or more first storage devices;

transferring, using a temporary RAID (Redundant Array of Independent Disks) 1 association, the reconstructed information from the one or more first storage devices to a second storage device; and using the second storage device as a member of the storage array in place of the original storage device.

2. The method according to claim 1, wherein the lost information is reconstructed onto a plurality of first storage devices, each first storage device in the plurality having a storage capacity smaller than the original storage device.

3. The method according to claim 2, wherein the lost information is reconstructed onto the plurality of first storage devices in parallel.

4. The method according to claim 1, wherein after the transferring, the one or more first storage devices are available for subsequent rebuilding of a storage array.

5. The method according to claim 1, wherein while a first storage device is in idle, it is used as a read cache for a storage array according to a tiered storage strategy.

6. The method according to claim 1, wherein the storage array is a redundant array of independent disks (RAID) consisting of hard drive disks (HDDs), and the one or more first storage devices are solid state drives (SSDs).

7. The method according to claim 1, wherein the one or more first storage devices are local to the storage array.

8. The method of claim 1, wherein the number of one or more first storage devices is equal to the number of write streams.

9. The method of claim 8, wherein each of the number of write streams is dedicated to a respective storage device of the one or more first storage devices.

10. A computing system, comprising:
one or more processors;
a memory coupled to at least one of the one or more processors;
a set of computer program instructions stored in the memory and executed by at least one of the one or more processors in order to perform actions of:
identifying a failure of an original storage device that is a member of a storage array;
reconstructing lost information that was on the original storage device onto one or more first storage devices based on information stored on one or more of remaining members of the storage array, wherein a number of read streams are used to read the storage array, the number of read streams including at least three, and wherein a number of write streams equal to the number of read streams is used to write to the one or more first storage devices,
wherein each of the one or more first storage devices has a higher I/O throughput than the original storage device;
transferring, using a temporary RAID (Redundant Array of Independent Disks) 1 association, the reconstructed information from the one or more first storage devices to a second storage device; and
using the second storage device as a member of the storage array in place of the original storage device.

11. The computing system according to claim 10, wherein the lost information is reconstructed onto a plurality of first storage devices, each having a storage capacity smaller than the original storage device.

12. The computing system according to claim 11, wherein the lost information is reconstructed onto the plurality of first storage devices in parallel.

13. The computing system according to claim 10, wherein after the transferring, the one or more first storage devices are available for subsequent rebuilding of a storage array.

14. The computing system according to claim 10, wherein while a first storage device is in idle, it is used as a read cache for a storage array according to a tiered storage strategy.

15. A computer program product for accelerating rebuilding of a storage array, the computer program product comprising a computer readable storage medium having program instructions embodied therewith, the program instructions being executable by a computer to cause the computer to:
identify a failure of an original storage device that is a member of a storage array;
reconstruct lost information that was on the original storage device onto one or more first storage devices based on information stored on one or more of remaining members of the storage array, wherein a number of read streams are used to read the storage array, the number of read streams including at least three, and wherein a number of write streams equal to the number of read streams is used to write to the one or more first storage devices,
wherein each of the one or more first storage devices has a higher I/O throughput than the original storage device;
transfer, using a temporary RAID (Redundant Array of Independent Disks) 1 association, the reconstructed information from the one or more first storage devices to a second storage device; and
use the second storage device as a member of the storage array in place of the original storage device.

16. The computer program product according to claim 15, wherein the lost information is reconstructed onto a plurality of first storage devices each having a storage capacity smaller than the original storage device.

17. The computer program product according to claim 16, wherein the lost information is reconstructed onto the plurality of first storage devices in parallel.

18. The computer program product according to claim 15, wherein after the transferring, the one or more first storage devices are available for subsequent rebuilding of a storage array.

19. The computer program product according to claim 15, wherein while a first storage device is in idle, it is used as a read cache for a storage array according to a tiered storage strategy.

* * * * *